United States Patent [19]
Naito et al.

[11] 3,795,291
[45] Mar. 5, 1974

[54] HYDRAULIC SHOCK-ABSORBING DEVICE

[75] Inventors: Masaharu Naito, Hamamatsu; Masae Watanabe, Iwata, both of Japan

[73] Assignee: Yamaha Hatsudoki Kabushiki Kaisha, Iwata-shi, Japan

[22] Filed: Sept. 18, 1972

[21] Appl. No.: 289,943

[30] Foreign Application Priority Data
Sept. 17, 1971 Japan.............................. 46-71770

[52] U.S. Cl................................. 188/274, 188/315
[51] Int. Cl............................................. F16f 9/42
[58] Field of Search........188/274, 314, 315, 264 D, 188/264 F; 165/47

[56] References Cited
UNITED STATES PATENTS
| | | | |
|---|---|---|---|
| 2,410,539 | 11/1946 | Whisler, Jr.......................... | 188/314 |
| 3,701,402 | 10/1972 | Chelnokov.......................... | 188/314 |

FOREIGN PATENTS OR APPLICATIONS
| | | | |
|---|---|---|---|
| 568,456 | 6/1958 | Belgium.............................. | 188/274 |
| 955,537 | 6/1949 | France................................ | 188/315 |
| 1,123,417 | 6/1956 | France................................ | 188/314 |
| 1,144,380 | 4/1957 | France................................ | 188/274 |
| 767,756 | 2/1957 | Great Britain...................... | 188/274 |
| 536,828 | 12/1955 | Italy.................................... | 188/315 |

Primary Examiner—George E. A. Halvosa
Attorney, Agent, or Firm—Holman & Stern

[57] ABSTRACT

A hydraulic shock-absorber of the oleo type with a double-acting piston and cylinder containing a damping fluid has an outer casing around the cylinder with an annular space interposed therebetween and communicating at its ends to the ends of the cylinder to constitute a fluid storage chamber, and this chamber is communicatively connected to a cooling device for cooling the fluid in the chamber and the cylinder, the fluid in the cylinder being caused by the movements of the piston to flow through the chamber and in and out of the cooling device.

7 Claims, 5 Drawing Figures

HYDRAULIC SHOCK-ABSORBING DEVICE

BACKGROUND

This invention relates generally to shock-absorbing devices and more particularly to a new and advanced hydraulic shock-absorbing device for use in vehicles, especially motor vehicles such as motorcycles.

When motor vehicles are being driven on paved roads, the hydraulic or oleo shock absorbers or shock dampers thereof undergo almost no up-and-down motion relative to the vehicle chassis, but when the vehicle is running over uneven ground such as rough terrain, the hydraulic shock-absorbers undergo rapid extension and constraction movements.

In general, a hydraulic shock-absorber of the instant character comprises, essentially, a cylinder filled with a damping fluid such as an oil and a piston slidably fitted in the cylinder and having small holes and check valves, through which the fluid flows when the piston slides within the cylinder, whereby oscillatory reciprocative movements occurring mutually between the piston and the cylinder are damped. Accordingly, when the vehicle rides over rough terrain, the up-and-down movements of the piston are vigorously repeated, and the temperature of the internally contained fluid rises rapidly. Consequently, the viscosity of the fluid decreases to a very low value, whereby the damping effect with respect to the reciprocative movement becomes very small or nonexistent. This gives rise to a loss of stability of the vehicle and a drop in its drivability. This difficulty tends to occur frequently particularly in hot weather.

SUMMARY

It is an object of this invention to provide a hydraulic shock-absorbing device in which rise of temperature of the damping fluid contained within the cylinder is suppressed to minimize lowering of the fluid viscosity, and impairment of the damping characteristic of the device as a shock-absorbing device is prevented.

According to this invention, briefly summarized, there is provided a hydraulic check-absorbing device for use in vehicles having a hydraulic cylinder containing a damping fluid and receiving therein in a piston which divides the cylinder interior into upper and lower chambers and is connected to a piston rod for transmission of external axial forces to the piston said shock-absorbing device further comprising a damping fluid cooling device provided at the lower part of the cylinder, and a vehicle weight carrying suspension coil spring disposed around the cylinder substantially above the cooling device.

It is also an object of this invention to provide a hydraulic shock absorbing device for vehicles in which a cooling device for suppressing the temperature rise of the damping fluid is located at the lower part of the device while a suspension coil spring is provided around the device as the upper part thereof whereby a compact design of the device is afforded.

The nature, principle, utility, and further features of this invention will be apparent from the following detailed description with respect to preferred embodiments of the invention when read in conjunction with the accompanying drawings, throughout which like parts are designated by like reference numerals.

DRAWINGS

DETAILED DESCRIPTION

Figure 2:
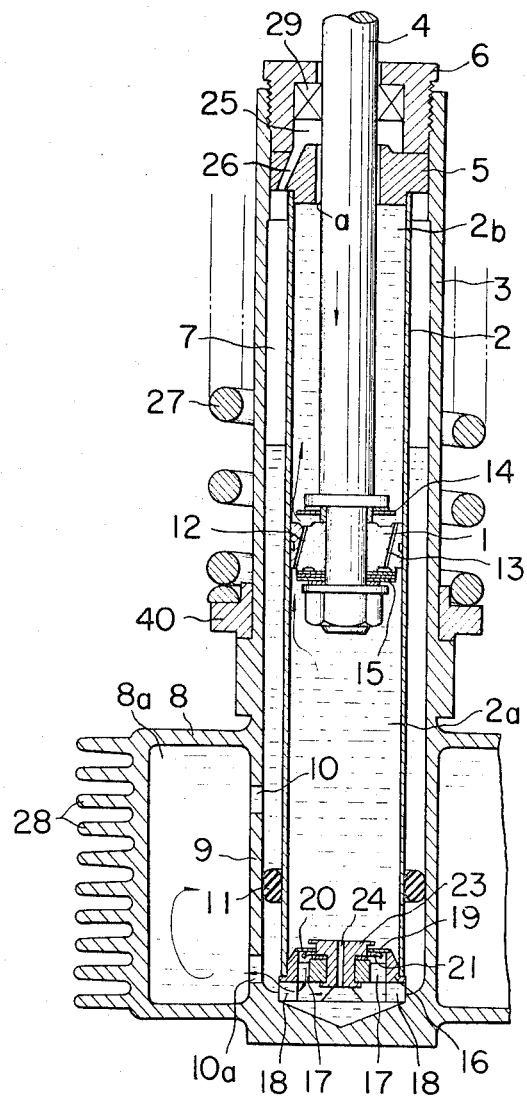
FIGS. 2 and 3 are side views, in longitudinal section, showing the essential parts of one example of the hydraulic shock-absorbing device according to this invention and respectively indicating (retraction) and ascent (extension) of the piston and piston rod.
Figure 3:
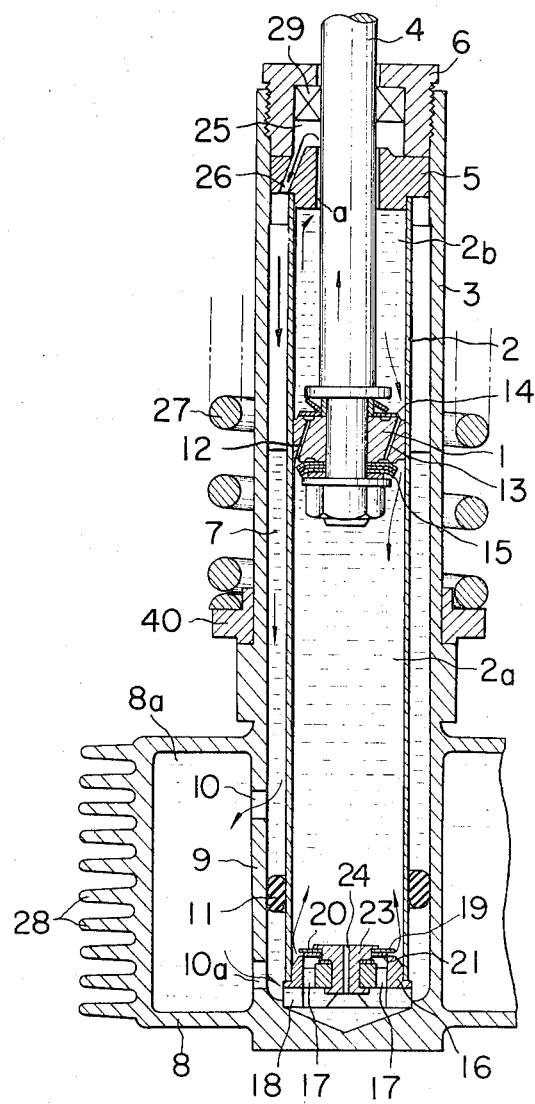

In the first example of the shock-absorbing device as illustrated in FIGS. 2 and 3, there is provided a cylinder 2 filled with a damping fluid and containing a piston 1 slidably fitted therein. The cylinder 2 is supported concentrically within an outer cylinder or casing 3 and is provided at its upper and with a slide bearing 5 through which the piston rod 4 of the piston 1 is slidably passed. The upper end of the outer casing 3 is provided with internal screw threads for receiving the threaded part of a gland 6, which upon being tightened, presses downward on the upper surface of the slide bearing 5 and thereby fixes together the cylinder 2 and the outer casing 3.

The outer cylindrical surface of the cylinder 2 and the inner cylindrical surface of the outer casing 3, being of different diameters and being mutually concentric, form a cylindrical space therebetween, which is used as a fluid storage chamber 7. A cooling device 8 is provided at the lower part of this fluid storage chamber 7.

In the example illustrated in FIGS. 2 and 3, this cooling device 8 is another cylinder formed integrally with the outer casing 3 and disposed concentrically around the lower part thereof. This cooling device is provided on its outer surface with cooling fins 28 for increased cooling effect. The inner diameter of this cooling device 8 is greater than the outer diameter of the lower part of the outer casing 3, whereby a cooler chamber 8a is formed therebetween, the lower part of the outer casing 3 constituting a partition 9 between the fluid storage chamber 7 and the cooler chamber 8a.

Upper and lower through holes 10 and 10a are formed at spaced-apart positions in the partition 9 and thereby constitute communicative passageways between the chambers 7 and 8a. An annular sealing material 11 such as an O-ring is fitted between the cylinder 2 and the outer casing 3 at a position between the upper and lower through holes 10 and 10a, whereby the fluid storage chamber 7 is partitioned in the region between these through holes.

The piston 1 is provided with passage holes 12 and 13 passing therethrough from its upper surface to its lower surface. These holes 12 and 13 are provided at their ends on respectively opposite sides with respective valves whereby some (12) of the holes are for the compression stroke (i.e., retraction stroke) of the piston, while the other holes (13) are for the return stroke (i.e., the extension stroke) of the piston.

More specifically, the upper surface of the piston 1 is provided with an annular valve plate 14 for closing the passage hole 12 during the extension stroke, while the lower surface of the piston 1 is provided with an annular valve plate 15 for closing the passage hole 13 during the retraction stroke. These valve plates are fitted around the inner end part of the piston rod 4 and can be separated away from their respective piston surfaces with specific gap distances. The valve plate 14 is stiff, while the valve plate 15 is flexible.

Within the cylinder 2 at the lower end thereof, there is fixedly installed a valve seat 16 provided with through holes 17, 17, which communicate at their lower ends with passage holes 18, 18 communicating at their ends with the lowest part of the aforedescribed fluid storage chamber 7.

At the upper part of this valve seat 16, there is provided a first valve plate 19 for closing the through holes 17, 17. This first valve plate 19 is provided with small holes 20, and the first valve plate 19 and a second valve plate 21 provided on the lower surface side of the first valve plate 19 are so mounted with a hollow rivet 23 that the small holes 20 can be closed by the second valve 21. This hollow rivet 23 has a central orifice 24, the lower open end of which communicates with the aforementioned passage holes 18, 18, thereby communicating with the lower end of the fluid storage chamber 7.

Between the aforedescribed slide bearing 5 and the piston rod 4, there is provided a clearance $a$ for permitting passage of the fluid. A small chamber 25 is formed between the slide bearing 5 and the gland 6 and is communicative with the upper end of the fluid storage chamber 7 through an escape hole 26. Escape of fluid from the chamber 25, through the necessary clearance between the piston rod 4 and the gland 6, to the outside is prevented by an oil seal 29 disposed around the piston rod 4 and in the upper part of the chamber 25.

Figure 1:
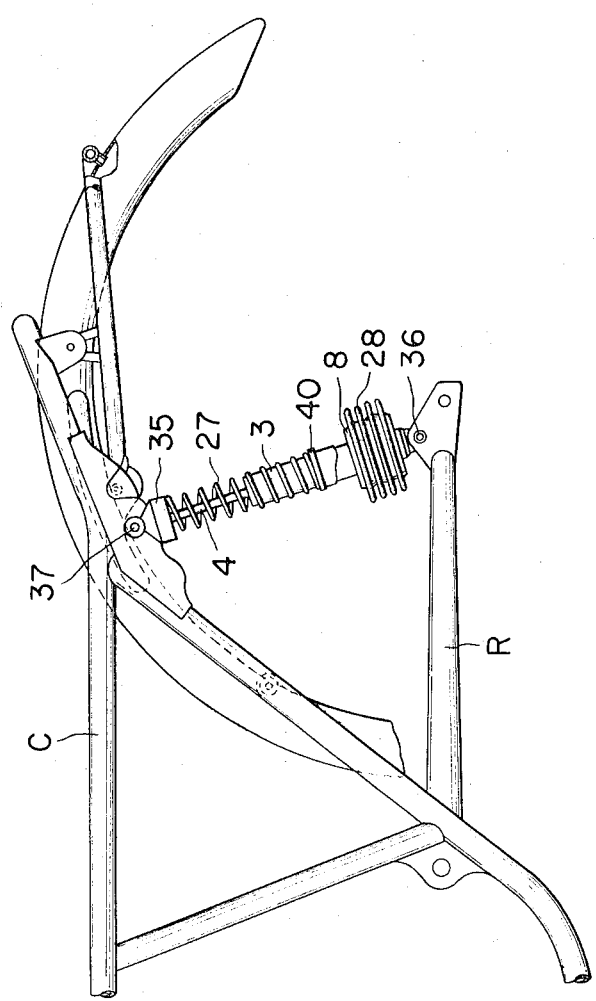
FIG. 1 is a fragmentary side view showing one example of the hydraulic shock absorbing device according to this invention as applied to a motorcycle.

Reference numeral 27 designates a suspension coil spring disposed around the outer cylinder 3 and bearing at its lower end on a part of the outer cylinder 3 by way of an annular spring retainer 40. As shown in FIG. 1, the upper end of this spring 27 is held down by a flanged member 35 fixed to the upper end of the piston rod 4. The upper end of the rod 4 is pivoted to a chassis C of a motorcycle by means of a pivot pin 37 and the lower end of the outer casing 3 is pivoted to a rear fork R. The suspension coil spring 27 supports the weight of the vehicle body and the rider.

Figure 4:
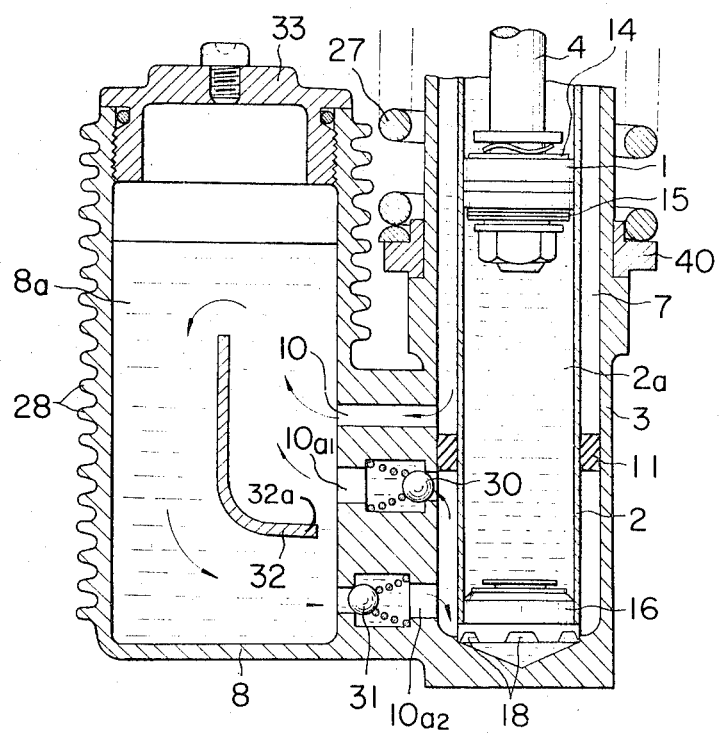
FIG. 4 is a side view, in longitudinal section with parts cut away, showing another embodiment of the invention.

In another example of a hydraulic shock-absorbing device according to this invention as illustrated in FIG. 4, the cooling device comprises a cooler 8 disposed at one side of the lower part of the outer casing 3 and the lower through hole 10$a$ communicating the fluid storage chamber 7 and the cooler 8 is divided into upper and lower passageways 10$a_1$ and 10$a_2$, in which check valves 30 and 31 are respectively installed with mutually reversed direction. Furthermore, a deflector 32 is installed within the cooler 8. In other respects, this example is similar to the preceding example illustrated in FIGS. 2 and 3.

More specifically, of the two divided lower passageways 10$a_1$ and 10$a_2$, the higher passageway 10$a_1$ is provided therewithin with a check valve 30 permitting fluid flow only from the fluid storage chamber 7 to the cooler chamber 8$a$, while the lower passageway 10$a_2$ is provided therewithin with a check valve 31 permitting fluid frow only from the cooler chamber 8$a$ to the fluid storage chamber 7. When the piston 1 descends or retracts, the fluid flowing out from the lower chamber 2$a$ of the cylinder 2 is caused to flow into the cooler chamber 8$a$ only through the higher passageway 10$a_1$.

The above mentioned deflector 32 is of curved L shape in vertical section as shown in FIG. 4, having a vertical part and a substantially horizontal lower flange with an extreme edge 32$a$ disposed at a height intermediate between the two passageways 10$a_1$ and 10$a_2$. This deflector 32 thereby guides the fluid flowing into and out of the cooler chamber, thereby increasing the rate of cooling of the fluid.

The cooler 8 in the instant example is provided at its top part with a opening for supplying fluid, which opening is normally closed with a screw plug cover 33.

Figure 5:
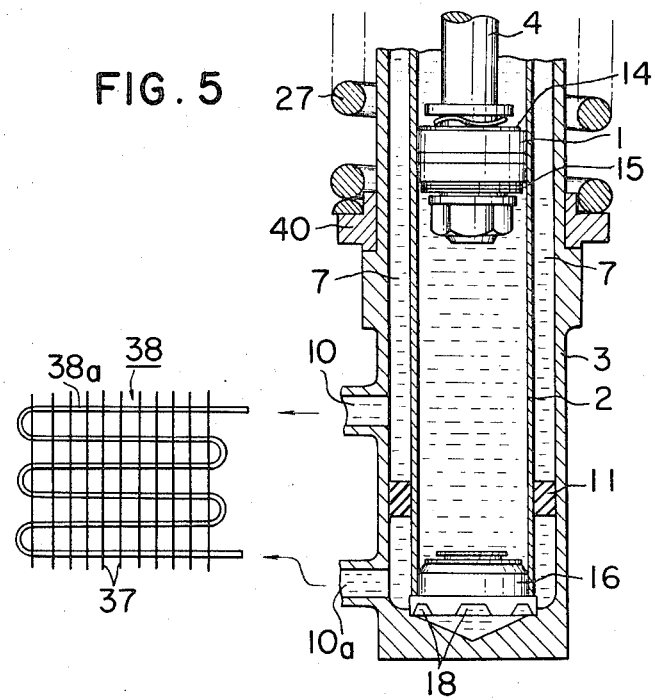
FIG. 5 is a similar view showing still another example of the device according to the invention.

In still another example of this invention as illustrated in FIG. 5, a cooler 38 of the cross-fin type, comprising a cooling tube 38$a$ connected at its ends to the upper and lower through holes 10 and 10$a$ communicating with the fluid storage chamber 7, and cross fins 37 disposed parallelly to each other and substantially perpendicularly to one or more passes of the cooling tube 38$a$. Where a cooler of tubular type is used as in this example, fluid pump (not shown) can be installed and operated to cause forced circulation of the fluid of the fluid storage chamber 7 through the cooler.

Except for the different features described above, the other features of construction of the examples illustrated in FIGS. 4 and 5, are similar to those of the first example shown in FIGS. 2 and 3.

These examples of the shock-absorbing device according to this invention operate in the following manner.

Referring first to FIGS. 2 and 3, when a load is applied on the device, that is, on the piston rod 4 to cause it to retract and move downward as viewed in the drawing, a portion of the damping fluid within the lower chamber 2$a$ of the cylinder 2 passes upward through the passage hole 12 in the piston 1 and, pushing open the upper valve plate 14, flows into the upper chamber 2$b$ of the cylinder 2.

At the same time, the second valve plate 21 of the valve seat 16 opens the small holes 20 of the first valve plate 19, and a portion of the fluid within the lower chamber 2$a$ passes through the passage hole 17 and flows downward from the valve seat, simultaneously flowing out also through the orifice 24. The fluid which has flowed thus out of the bottom of the cylinder 2 passes through the passage holes 18 and enters the fluid storage chamber 7.

This fluid flows at a high velocity through the lower through hole 10$a$ and into the cooler chamber 8$a$ and, mixing with the fluid at low temperature within this chamber, is cooled.

Then, when the piston 1 completes its downward or retraction stroke and begins its upward or extension stroke, the cooled fluid within the cooler chamber 8$a$ flows through the lower through hole 10$a$, enters the fluid storage chamber 7, passes through the passage holes 18 and passage holes 17, and, pushing open the first valve plate 19, enters the lower chamber 2$a$ of the cylinder 2. During this reverse flow of the fluid, reverse entering flow occurs also through the orifice 24.

At the same time, a portion of the fluid in the upper cylinder chamber 2$b$ passes downward through the passage hole 13 and, pushing open the lower valve plate 15, flows into the lower cylinder chamber 2$a$. Simultaneously, another portion of the fluid in the upper cylinder chamber 2b passes upward through the clearance a between the slide bearing 5 at the upper part of the cylinder 2 and the piston rod 4, passes through the small chamber 25, flows through the escape hole 26 into the fluid storage chamber 7, flows through the upper through hole 10 into the cooler chamber 8a, and is cooled by mixing with the low-temperature fluid within the cooler chamber 8a.

When the fluid temperature rises further and the viscosity of the fluid begins to decrease, the quantity of fluid flowing out through the clearance a between the slide bearing 5 and the piston rod 4 increases, and the fluid flowing into the fluid storage chamber 7 reaches the cooler chamber 8a through the upper through hole 10 and, furthermore, flows through a circulatory path through the lower through hole 10a into the lower part of the fluid storage chamber 7, through the passage holes 18 and 17, and into the lower cylinder chamber 2a. The fluid is thereby cooled during this flow thereof.

In the example illustrated in FIG. 4, fluid which has flowed downward from the upper part of the storage chamber 7 enters the cooler chamber 8a through the upper through hole 10. Fluid from the lower part of the storage chamber 7 passes through the higher hole $10a_1$ of the through holes, pushing open the check valve 30, and enters the cooler chamber 8a. The fluid which has entered the cooler chamber 8a is guided upward by the deflector 32 and, after reaching the upper part of the chamber 8a, flows downward on the opposite side of the deflector 32.

When the piston 1 ascends in its extension stroke, and fluid is drawn into the lower cylinder chamber 2a from the cooler chamber 8a, the fluid thus drawn pushes open the check valve 31 of the lower through hole $10a_2$ and flows in the lower part of the fluid storage chamber 7.

In the hydraulic shock-absorbing device according to this invention as described above, an outer cylinder or casing 3 is provided concentrically around a cylinder 2 filled with a fluid and containing a piston 1 slidably fitted therein. Accordingly, a cylindrical fluid storage chamber 7 is formed between the outer casing 3 and the cylinder 2, and this chamber 7 is communicative with upper and lower cylinder chambers 2b and 2a and also with the interior of a cooling device 8.

By this construction of the shock-absorbing device, the reciprocating movements of the piston 1 due to outside forces cause flow movements of the fluid within the cylinder 2 and the chamber 7, whereby the fluid is introduced into and subsequently drawn out of the cooling device 8, and temperature rise of the fluid is thereby suppressed. The viscosity of the fluid within the cylinder 2 is thereby prevented from decreasing, and impairment of the damping action of the device as shock-absorbing device is prevented. Therefore, an extremely comfortable shock-absorbing action can be obtained even when the vehicle is running over unleveled ground or rough terrain.

Furthermore, since there is practically no temperature rise, there is no possibility of an abnormal rise in the pressures within the cylinder 2 and the outer casing 3 to cause leakage of the fluid due to damage such as rupturing of seals.

From the foregoing, it has now been made clear that this invention provides a hydraulic shock-absorbing device which is compact in design because of the provision of the cooling device at the lower part of the device and of the suspension coil spring at the upper part of the device.

We claim:

1. In a hydraulic shock-absorbing device for use in vehicles having a hydraulic cylinder containing a damping fluid and receiving therein a piston which divides the interior of said hydraulic cylinder into upper and lower chambers, said piston being connected to a piston rod which transmits external axial forces to said piston, and an outer casing provided concentrically with and exteriorly of said hydraulic cylinder to thus form a damping fluid storage chamber having an upper and a lower end, between the outside surface of said hydraulic cylinder and the inner surface of said casing, said storage chamber communicating at its ends with respective outer extremities of said upper and lower chambers so that the damping fluid in said lower chamber flows into said upper chamber and into said lower end of said storage chamber during a retraction stroke of said piston, and the damping fluid in said upper chamber flows into said lower chamber and into the upper end of said storage chamber during an extension stroke of said piston; the improvement comprising:

a damping fluid cooling means disposed on said outer casing adjacent the lower portion of said storage chamber, said outer casing having upper and lower through holes formed therein and spaced apart along the direction of the longitudinal axis of said hydraulic cylinder, said through holes communicatively connecting said damping fluid cooling means with said storage chamber;

an annular member means disposed in said storage chamber so as to be interposed between said hydraulic cylinder and said outer casing at a position intermediate between said two through holes, said member means partitioning said storage chamber into upper and lower parts; and a vehicle weight carrying suspension coil spring disposed around said outer casing substantially above said cooling means, said improvement operating whereby when said damping fluid is caused to flow into a respective one of said upper and lower parts of said storage chamber, it flows into the other part of said storage chamber through said lower through hole, said damping fluid cooling means and said upper throughhole, thus executing forced circulatory motion inside said shock absorber to cause continuous cooling of said damping fluid.

2. A hydraulic shock-absorbing device as claimed in claim 1 in which said cooling means has cooling fins disposed thereon for dissipating heat therefrom.

3. A hydraulic shock-absorbing device as claimed in claim 1 in which said cooling means has an annular cooling chamber disposed around the lower portion of said outer casing and communicating with said storage chamber by means of said two through holes.

4. A hydraulic shock-absorbing device as claimed in claim 1 in which said cooling means comprises a radiator-type cooling coil having extremities thereof connected communicatively with said fluid storage chamber through said upper and lower through holes.

5. A hydraulic shock-absorbing device as claimed in claim 1 in which said cooling means comprises a cooler disposed on one side of the lower portion of said outer casing, said cooler having cooling chamber which communicates with said storage chamber by means of said two through holes.

6. A hydraulic shock-absorbing device as claimed in claim 5, further comprising a third through hole formed in the lower portion of said outer casing at a position intermediate between said two through holes, said annular member means being positioned intermediate between said upper and said third through holes; first check valve means provided in said third through hole and permitting fluid flow only from said lower part of said storage chamber to said cooling chamber; second check valve means provided in said lower through hole and permitting fluid flow only from said cooling chamber to said lower part of said storage chamber; and a deflecting member having an extreme edge disposed intermediate between said lower and third through holes.

7. A hydraulic shock-absorbing device as claimed in claim 5 in which said cooler has an opening at the top thereof for supplying fluid thereto, said opening being normally closed with a plug cover.

* * * * *

UNITED STATES PATENT OFFICE
CERTIFICATE OF CORRECTION

Patent No. 3795291            Dated March 5, 1974

Inventor(s) Masaharu Naito, et al

It is certified that error appears in the above-identified patent and that said Letters Patent are hereby corrected as shown below:

[30] Foreign Priority Document

Japan No. 71770/1971   September 17, 1971

Figure 6:
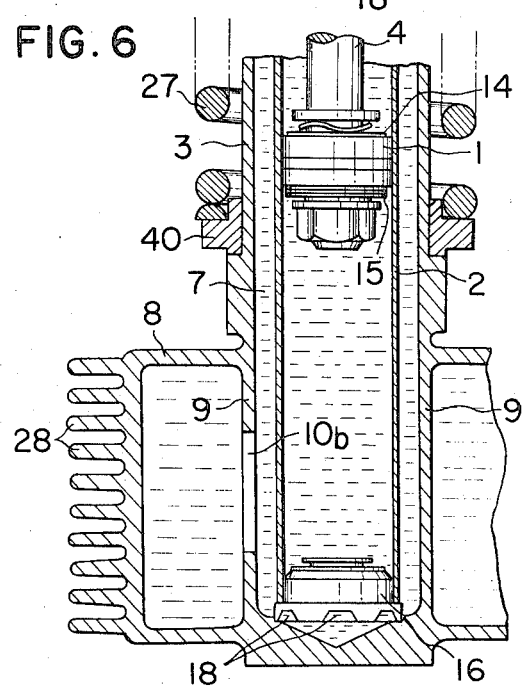

In the drawings: Delete Fig. 6

Signed and sealed this 17th day of September 1974.

(SEAL)
Attest:

McCOY M. GIBSON JR.
Attesting Officer

C. MARSHALL DANN
Commissioner of Patents